UNITED STATES PATENT OFFICE.

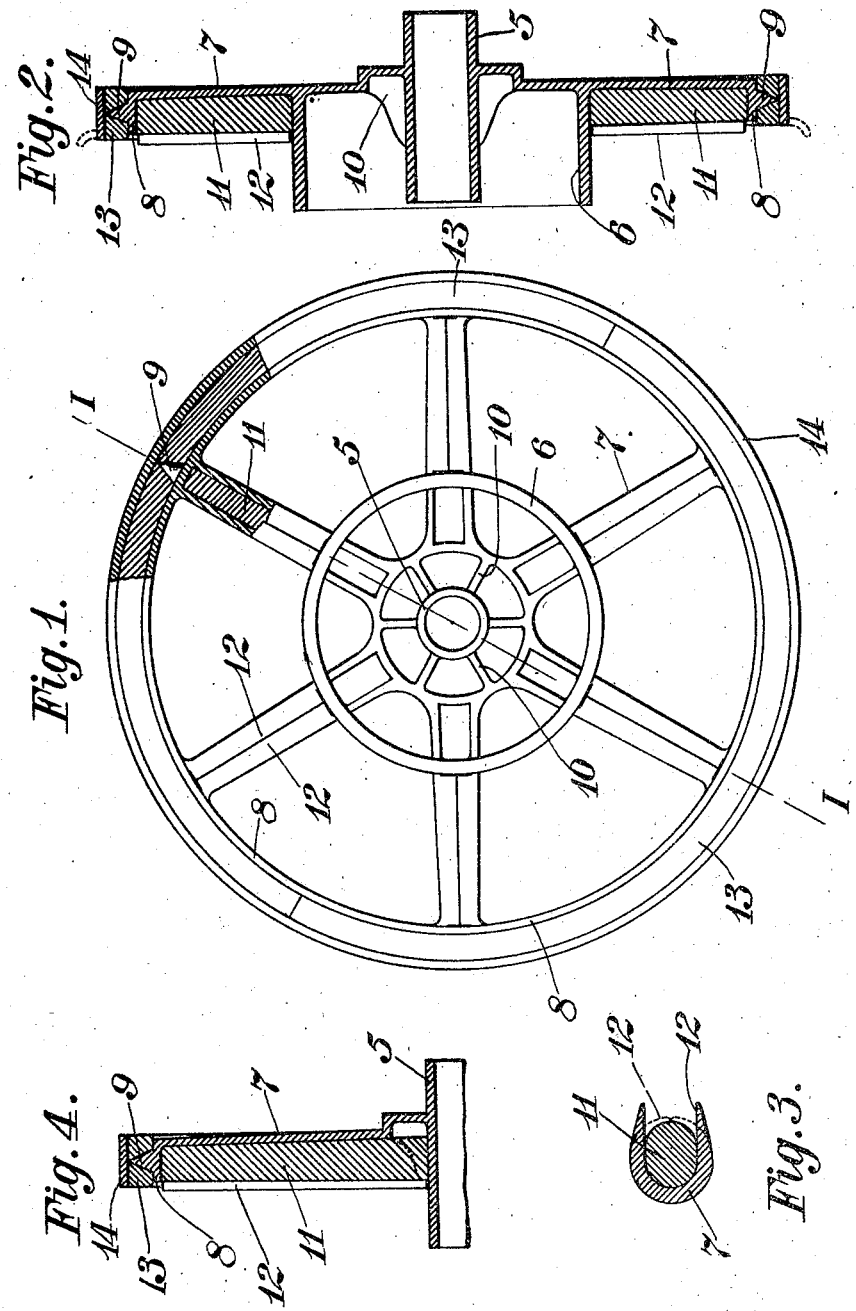

SAMUEL E. MORRAL, OF MORRAL, OHIO.

WHEEL.

1,328,052.  Specification of Letters Patent.  Patented Jan. 13, 1920.

Application filed February 15, 1917. Serial No. 148,738.

*To all whom it may concern:*

Be it known that I, SAMUEL E. MORRAL, a citizen of the United States, residing at Morral, in the county of Franklin and State of Ohio, have invented a certain new and useful Improvement in Wheels, of which the following is a specification.

The wheels for motor and other large vehicles are at the present time constructed mostly of hard wood. Such wood is growing scarcer and higher in price. The object of the present invention is the production of a wheel largely of metal which can be economically cast and be light in weight.

The invention is embodied in the example herein shown and described and finally claimed.

In the accompanying drawing forming part hereof—

Figure 1 is a view in elevation of the inner side of the wheel, a small portion being broken out and shown in section to illustrate details.

Fig. 2 is a diametrical sectional view, on say the line I—I Fig. 1.

Fig. 3 is a cross-sectional view through the spoke of a wheel.

Fig. 4 is a longitudinal sectional view of a spoke.

In the views, referring more particularly to Figs. 1 and 2, the character 5 designates the hub; 6 the brake drum, 7 the spokes; 8 the rim connecting the spokes and 9 spurs on said rim to engage a tire or supplemental rim. The parts enumerated are all cast in one piece of malleable iron or steel and the structure, excepting as to the spurs, is hollow at one side so as to be easily cast and form a wheel light in weight but strong and durable. Short webs 10 connecting the frame of the wheel and hub can be added to brace the hub.

For appearance sake and to give a solid effect to the spokes they can be filled with wood 11 or other light material held in place by thin pliable flanges 12 bent over to inclose the wood, as shown by broken lines in Fig. 4.

The felly as shown includes two semicircular pieces of wood 13, 13, provided with holes to receive the conical spurs 9. These spurs are an important feature because they permit the application of the curved pieces of felly and prevent subsequent lateral dislodgment of them. The parts of the felly are shown as bound upon the rim circumferentially by means of a metallic tire 14 or band shrunk on. This metallic tire can, of course, be channeled or otherwise constructed to receive a rubber tire as suggested by broken lines in Fig. 2.

In Fig. 4 the brake drum is omitted and the spoke shown as filled with wood its entire length. In such construction the flanges 12 are correspondingly extended to inclose the wood or other material inserted in the same.

The construction in either form is such as to require little or no coring in forming the molds, and because the rim, spokes and hub are in one integral casting sufficient strength may be obtained without resort if desired to as many spokes as heretofore customary in wheels.

The forms of the parts can be changed and some parts omitted without departing from the gist of the invention as claimed.

What I claim is:

1. A wheel having its hub, spokes and rim with centrally located felly-penetrating spurs thereon cast in one piece.

2. A wheel having its spokes cast hollow at one side and with flanges, fillers in said hollow spokes, the flanges being bent over said fillers.

3. A wheel having its spokes and a rim cast in one piece, said rim being provided with tapering outwardly projecting fellypenetrating spurs located on the rim opposite the outer ends of the spokes.

SAMUEL E. MORRAL.